(No Model.)
H. F. CAMPBELL.
ELECTRIC CIRCUIT.
No. 313,053. Patented Mar. 3, 1885.
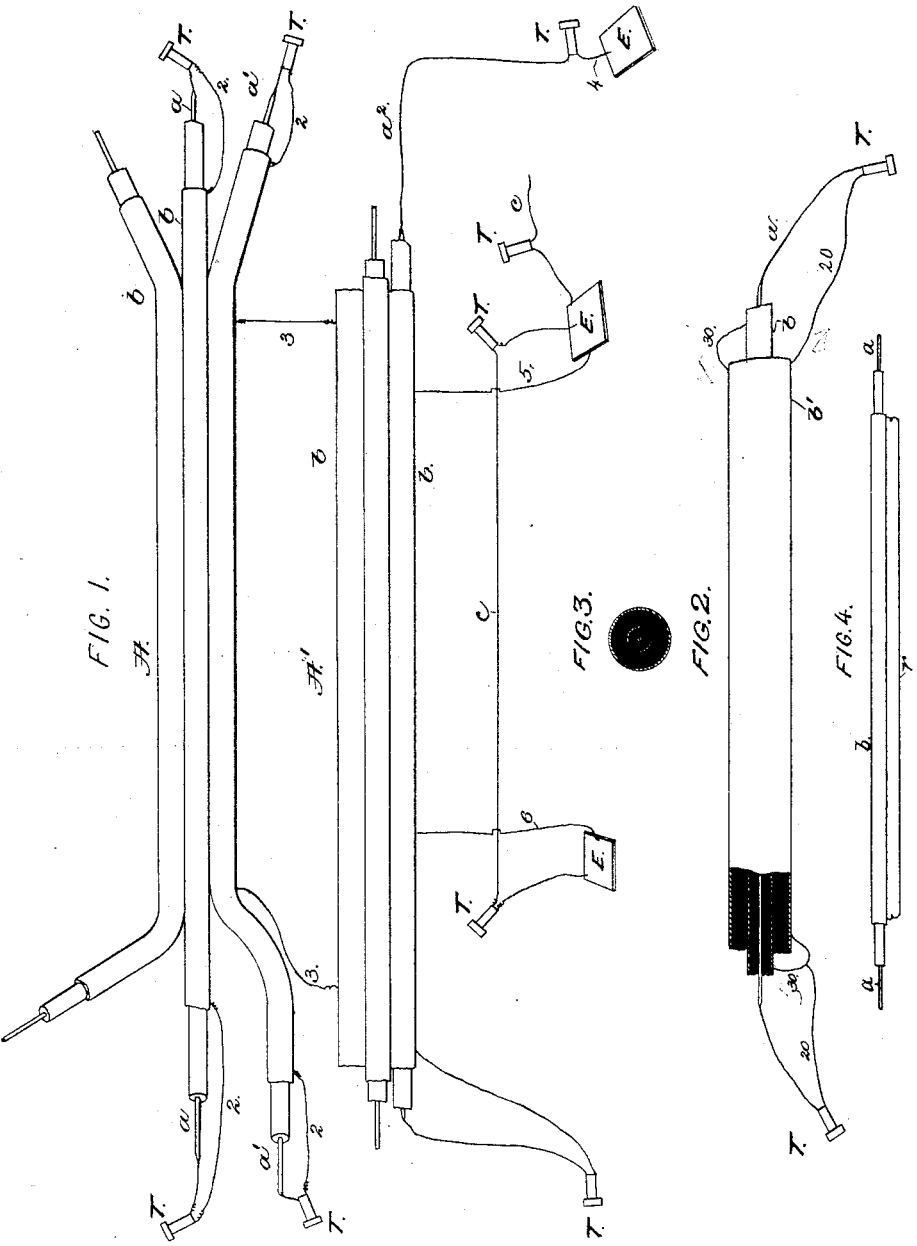

UNITED STATES PATENT OFFICE.

HENRY F. CAMPBELL, OF CONCORD, NEW HAMPSHIRE.

ELECTRIC CIRCUIT.

SPECIFICATION forming part of Letters Patent No 313,053, dated March 3, 1885.

Application filed February 8, 1884. (No model.)

*To all whom it may concern:*

Be it known that I, HENRY F. CAMPBELL, of Concord, county of Merrimac, State of New Hampshire, have invented an Improvement in Electric Circuits, of which the following description, in connection with the accompanying drawings, is a specification, like letters on the drawings representing like parts.

My invention has for its object to prevent disturbances arising from induction or earth currents, and also to obviate the effect of retardation, which is so detrimental to the operation of long cables.

In other patents granted to me December 25, 1883, I have shown and described electrical conductors and cables provided with shields composed of para-magnetic or combined para-magnetic and dia-magnetic substances, which are very effectual in preventing induction between parallel wires.

The present invention consists, partly, in connecting together at their ends the anti-inductive shields of two independent cables.

The invention further consists in connecting the telephone or other instrument in circuit between one of the independent wires of the cable and the shield of the said wire or cable, by which arrangement I find that the retardation and disturbances arising from earth currents became less than when the circuit is completed between the ends of the shield and of the inclosed wire by the ground in the manner usually practiced.

The invention further consists in an insulated conductor provided with two concentric anti-inductive shields insulated from one another and electrically connected together at the ends of the cable, so as to form a complete metallic circuit traversing the entire length of the cable.

Figure 1 shows in diagram a number of circuits constructed and arranged in accordance with this invention.

A A' represents two cables having substantially the same direction, or extending between the same terminal points, each cable being composed of a group of insulated conductors, as $a'$ $a^2$, &c., preferably each provided with an anti-inductive shield, $b$, composed of para-magnetic or combined dia-magnetic and para-magnetic materials, as set forth in my former patents hereinbefore referred to. The said conductors $a$ $a'$, &c., upon leaving the cable branch out to the different minor stations, where they are connected with the telephones T or other electrical instruments to be placed in circuit, the other terminals of the said telephones or instruments being connected by wires 2 with the said anti-inductive shield $b$, which thus forms the return portion of the circuit, which is itself not necessarily connected with the ground at any point. The cables A A' have the shield portions $b$ electrically connected together at the ends of the cables by wires 3, thus forming a complete circuit through the said shields. In some cases the wires, as shown at $a^2$, may be extended some distance beyond the ends of the cable, being connected with the instrument T, which in this arrangement will be connected with the ground, as by the wire 4, in the usual manner, and in order to complete the circuit the shields $b$ near the end of the cable will also be connected with the ground by wire 5. The earth-plates, water-pipes, or other metal embedded in the earth to form a ground-connection, (represented at E,) when used for circuits $c$ not protected by anti-inductive shields, will preferably be connected with the anti-inductive shields of cables or conductors that may be near at hand, as shown by the wires 5 and 6, which connection is found to be extremely beneficial to the said unprotected circuits $c$, relieving them to a large extent of the effects of earth-currents.

By the term "cable" I mean to include any conductor or group of conductors, and the shield or covering $b$ may consist of a pipe or a wrapping of wire or ribbon or other covering outside of the insulation of each individual conductor or outside of the entire group of conductors, which may or may not each be provided with an anti-inductive shield, the said covering being composed of the para-magnetic or combined para-magnetic and dia-magnetic material.

The connection of the shields or outer metallic coverings of two or more cables is especially advantageous when the said cables are buried beneath the surface of the ground or are laid under water, and in order to insure the best results the said covering in the two cables, as well as the connecting-wires 3 between their adjacent terminals, should be of about equal capacity, and the shields connected together at a point beyond the submerged or buried portion.

By the connection together in circuit with one another of the shields or coverings of two cables the currents which pass along the outer covering of either cable, and would without such connection be discharged at the ends of the cable upon the inclosed conductor or conductors, will be conveyed to the other shield, and their disturbing influence thus removed from the inclosed wires and instruments included in circuit therewith.

In the case of a submarine or other cable, when there is no neighboring shielded cable to complete a shield-circuit, the construction shown in Figs. 2 and 3 may be adopted, the wire $a$ being suitably insulated as usual and provided with an anti-inductive shield or covering, $b$, over the said insulation, which covering is surrounded by insulating material and inclosed in a secondary or outer anti-inductive covering, $b'$, the two coverings $b\ b'$ being electrically connected at their ends by wires 30, to make a complete shield-circuit. The circuit for the inclosed wire $a$ is completed by wires 20 and the shields $b\ b'$, and the evils arising from a grounded circuit, or one composed partly of the earth, are wholly avoided.

I do not in the present application claim the specific construction illustrated in Figs. 2 and 3, as this forms the subject of another application for Letters Patent filed July 7, 1884, No. 137,000.

In my former Patent No. 290,854, December 25, 1883, I showed a cable composed of a series of conductors each shielded, and the shields each forming a part of a metallic circuit extending the length of the cable and included within the cable. In some instances, where the cable consists of a number of conductors (either each independently shielded or not) inclosed in a pipe of iron or steel or other materials having the properties requisite for an anti-induction shield, as shown in Fig. 4, it may be desirable to complete the circuit for the shield by a special wire, $r$, instead of by the shield of another cable.

I do not broadly claim a conductor having an insulating-covering and another tubular conductor at the outside thereof employed to complete the circuit for the inclosed conductor, as I am aware that such conductors have been previously employed; but in all cases, so far as I am aware, previous to my invention the outer conductor has been composed of tin, lead, or copper, or in all solely of dia-magnetic material; and my invention consists in the employment of an outer conductor composed mainly of para-magnetic material, which I have found by experiment gives far better results in suppressing inductive disturbances and diminishing the retardation which is found to prevent telephonic communication over long distances by the conductors heretofore employed.

I claim—

1. The combination of two or more separate cables each having outside of the insulating material of its inclosed conductor or conductors a shield or covering composed mainly of para-magnetic material with conductors connecting the shields or coverings together, substantially as and for the purpose specified.

2. An electrical conductor insulated and provided with a shield or covering composed mainly of para-magnetic material combined with a telephone or other electrical instrument connected in circuit between the said conductor and shield, substantially as described.

3. An electric cable having an anti-inductive outer covering composed mainly of paramagnetic material combined with a wire, $r$, connecting the ends of the said covering, substantially as described.

In testimony whereof I have signed my name to this specification in the presence of two subscribing witnesses.

HENRY F. CAMPBELL.

Witnesses:
WILLIAM VOGLER,
BETSEY G. CAMPBELL.